(12) United States Patent
Goecke

(10) Patent No.: US 8,343,292 B1
(45) Date of Patent: Jan. 1, 2013

(54) ADHESIVE TAPE

(75) Inventor: Thomas R. Goecke, Rocky River, OH (US)

(73) Assignee: ShieldMark, Inc., Rocky River, OH (US)

( * ) Notice: Subject to any disclaimer, the term of this patent is extended or adjusted under 35 U.S.C. 154(b) by 0 days.

(21) Appl. No.: 13/342,528

(22) Filed: Jan. 3, 2012

Related U.S. Application Data

(63) Continuation of application No. 10/674,108, filed on Sep. 29, 2003, now Pat. No. 8,088,480.

(51) Int. Cl.
*E04F 13/07* (2006.01)
*B29C 47/02* (2006.01)
*B29C 47/06* (2006.01)
*C09J 5/00* (2006.01)
*D06N 7/04* (2006.01)
*C09J 7/02* (2006.01)
*B32B 7/12* (2006.01)

(52) U.S. Cl. ............ 156/71; 156/244.11; 156/307.3; 428/141; 428/332; 428/337; 428/906

(58) Field of Classification Search .......... 156/71, 156/242, 244.11, 247, 249, 307.1, 307.3; 428/40.1, 408.8, 41.6, 42.1, 141, 174, 332, 428/337, 343, 906
See application file for complete search history.

(56) References Cited

U.S. PATENT DOCUMENTS

| | | | | |
|---|---|---|---|---|
| 2,559,990 A | * | 7/1951 | Oace et al. | 428/337 |
| 3,895,153 A | * | 7/1975 | Johnston et al. | 428/141 |
| 4,248,762 A | * | 2/1981 | Hornibrook et al. | 524/441 |
| 4,343,856 A | * | 8/1982 | Goswami et al. | 428/332 |
| 4,484,574 A | * | 11/1984 | DeRusha et al. | 602/75 |
| 5,061,559 A | * | 10/1991 | Ogusi et al. | 428/343 |
| 5,246,773 A | * | 9/1993 | Mamish | 442/71 |
| 5,496,636 A | * | 3/1996 | Gu et al. | 428/352 |
| 5,508,084 A | * | 4/1996 | Reeves et al. | 428/172 |
| 5,686,170 A | * | 11/1997 | Condon et al. | 428/207 |
| 5,839,977 A | * | 11/1998 | Maurer et al. | 473/446 |
| 6,036,997 A | * | 3/2000 | Ragland et al. | 427/208.4 |
| 6,245,382 B1 | * | 6/2001 | Shvartsman et al. | 427/208.2 |
| 6,277,468 B1 | * | 8/2001 | Nakamoto et al. | 428/156 |
| 6,440,538 B1 | * | 8/2002 | Ungar | 428/195.1 |
| 6,461,715 B1 | * | 10/2002 | Guenther et al. | 428/131 |
| 6,509,084 B2 | * | 1/2003 | Sturtevant et al. | 428/141 |
| 6,668,504 B2 | * | 12/2003 | Hughart | 52/481.1 |
| 8,088,480 B2 | * | 1/2012 | Goecke | 428/343 |
| 8,178,190 B2 | * | 5/2012 | Savagian et al. | 428/203 |
| 2003/0127184 A1 | * | 7/2003 | Hill et al. | 156/275.5 |
| 2003/0127193 A1 | * | 7/2003 | Hill et al. | 156/379.8 |
| 2005/0000643 A1 | * | 1/2005 | Bellafore et al. | 156/291 |
| 2005/0069697 A1 | * | 3/2005 | Goecke | 428/343 |

(Continued)

OTHER PUBLICATIONS

Invalidity and Unenforceability Contentions of InSite Solutions, LLC Under L.P.R. 3.5(d) and 3.6; *ShieldMark, Inc.* v. *InSite Solutions, LLC*; ND Ohio ED, 1:12-cv-00223-DCN; Jun. 15, 2012 (3 pages).

(Continued)

*Primary Examiner* — Sing P Chan
(74) *Attorney, Agent, or Firm* — Brennan, Manna & Diamond, LLC

(57) ABSTRACT

The pressure sensitive adhesive tape of this invention comprises a first layer of polymeric material, particularly a polyvinyl chloride, having a Shore A Hardness of between 92 and 100 and a second layer of adhesive material attached to a surface of the layer of polymeric material.

11 Claims, 1 Drawing Sheet

U.S. PATENT DOCUMENTS

| | | | | |
|---|---|---|---|---|
| 2007/0082195 | A1* | 4/2007 | Goecke et al. | 428/343 |
| 2008/0182077 | A1* | 7/2008 | Lowe | 428/189 |
| 2011/0117336 | A1* | 5/2011 | Savagian et al. | 428/203 |

OTHER PUBLICATIONS

Defendant's Proposed Claim Terms Requiring Construction; *ShieldMark, Inc. v. InSite Solutions, LLC*; ND Ohio ED, 1:12-cv-00223-DCN; Jul. 17, 2012 (3 pages).

Plaintiff's Validity and Enforceability Contentions Pursuant to Local Patent Rule 3.7; *ShieldMark, Inc. v. InSite Solutions, LLC*; ND Ohio ED, 1:12-cv-00223-DCN; Jul. 23, 2012 (32 pages).

Defendant's Motion for Summary Judgment of Patent Invalidity; *ShieldMark, Inc. v. InSite Solutions, LLC*; ND Ohio ED, 1:12-cv-00223-DCN; Aug. 14, 2012 (2 pages).

Brief in Support of Defendant's Motion for Summary Judgment; *ShieldMark, Inc. v. InSite Solutions, LLC*; ND Ohio ED, 1:12-cv-00223-DCN; Aug. 14, 2012 (47 pages).

Defendant's Opposition to Plaintiffs Motion for Preliminary Injunction; *ShieldMark, Inc. v. InSite Solutions, LLC*; ND Ohio ED, 1:12-cv-00223-DCN; Aug. 14, 2012 (16 pages).

ShieldMark, Inc.'s Motion to Strike the Affidavit of a Sales Manager Named Hendrikus Gerrits Pursuant to Rule 56(c) (4); *ShieldMark, Inc. v. InSite Solutions, LLC*; ND Ohio ED, 1:12-cv-00223-DCN; Sep. 14, 2012 (8 pages).

Reply Brief in Support of Plaintiff's Request for Preliminary Injunction; *ShieldMark, Inc. v. InSite Solutions, LLC*; ND Ohio ED, 1:12-cv-00223-DCN; Sep. 14, 2012 (8 pages).

Plaintiffs Memorandum in Opposition to Defendant's Motion for Summary Judgment; *Shield Mark, Inc. v. InSite Solutions, LLC*; ND Ohio ED, 1:12-cv-00223-DCN; Sep. 14, 2012 (86 pages).

High Quality Tapes and Labels, Windmill Tapes—Industrial PVC Tapes, http://www.windmilltapes.com/pvc.html, Product Data Sheet; Aug. 16, 2004 (1 page).

Merriam-Webster's Collegiate Dictionary, 1996, Merriam-Webster, Incorporated, Tenth Edition, pp. 335 and 1205 (4 pages).

Handbook of Pressure Sensitive Adhesive Technology, 3d Edition, Satas & Associates, 1999, Chapter 5—Peel Adhesion, p. 79 (1 page).

Letter from R. Fischer to M. Pangrace; *ShieldMark, Inc. v. Creative Safety Supply, LLC*; ND Ohio ED, 1:12-cv-00221-CAB; Aug. 24, 2012 (84 pages).

Letter from W. Harders to L. Secor; *ShieldMark, Inc. v. Creative Safety Supply, LLC*; ND Ohio ED, 1:12-cv-00221-CAB; Sep. 14, 2012 (6 pages).

Amended Complaint for Patent Infringement, Trademark and Service Mark Infringement, Unfair Competition and Deceptive Trade Practices; *ShieldMark, Inc. v. Creative Safety Supply, LLC*; ND Ohio ED, 1:12-cv-00221-CAB; Mar. 5, 2012 (17 pages).

Plaintiff's Motion for Preliminary Injunction; *ShieldMark, Inc. v. Creative Safety Supply, LLC*; ND Ohio ED, 1:12-cv-00221-CAB; Mar. 29, 2012 (44 pages).

Answer to Amended Complaint for Patent Infringement, Trademark and Service Mark Infringement, Unfair Competition and Deceptive Trade Practices and Counterclaim; *ShieldMark, Inc. v. Creative Safety Supply, LLC*; ND Ohio ED, 1:12-cv-00221-CAB; Apr. 9, 2012 (17 pages).

Defendant Creative Safety Supply, LLC's Memorandum in Opposition to Motion for Preliminary Injunction; *ShieldMark, Inc. v. Creative Safety Supply, LLC*; ND Ohio ED, 1:12-cv-00221-CAB; Apr. 17, 2012 (21 pages).

Defendant Creative Safety Supply, LLC's Memorandum in Opposition to Plaintiffs Motion to Strike and/or Exclude the Affidavit of James K. Poole; *ShieldMark, Inc. v. Creative Safety Supply, LLC*; ND Ohio ED, 1:12-cv-00221-CAB; May 11, 2012 (87 pages).

Defendant Creative Safety Supply, LLC's Memorandum in Response to Plaintiffs Motion to Dismiss and/or Strike Defendant's Counterclaim(s); *ShieldMark, Inc. v. Creative Safety Supply, LLC*; ND Ohio ED, 1:12-cv-00221-CAB; May 17, 2012 (12 pages).

Defendant Creative Safety Supply, LLC's Notice of Initial Noninfringement Contentions; *ShieldMark, Inc. v. Creative Safety Supply, LLC*; ND Ohio ED, 1:12-cv-00221-CAB; May 24, 2012 (9 pages).

Notice Regarding Amended Counterclaims to be Asserted by Defendant Creative Safety Supply, LLC; *ShieldMark, Inc. v. Creative Safety Supply, LLC*; ND Ohio ED, 1:12-cv-00221-CAB; May 24, 2012 (3 pages).

Order; *ShieldMark, Inc. v. Creative Safety Supply, LLC*; ND Ohio ED, 1:12-cv-00221-CAB; Jun. 27, 2012 (2 pages).

Motion to Amend Counterclaims and Add Third Party Defendants; *ShieldMark, Inc. v. Creative Safety Supply, LLC*; ND Ohio ED, 1:12-cv-00221-CAB; Jul. 2, 2012 (41 pages).

Defendant Creative Safety Supply, LLC's Notice of Initial Invalidity Contentions; *ShieldMark, Inc. v. Creative Safety Supply, LLC*; ND Ohio ED, 1:12-cv-00221-CAB; Jul. 13, 2012 (25 pages).

Non-Party Proposed Third Party Defendants W. Scott Harders, Esq. and Brennan, Manna & Diamond, LLC's Oppositions to Defendant's Motion to Amend Counterclaims and Add Third Party Defendants; *ShieldMark, Inc. v. Creative Safety Supply, LLC*; ND Ohio ED, 1:12-cv-00221-CAB; Jul. 30, 2012 (5 pages).

Plaintiffs Memorandum in Opposition to Motion to Amend Counterclaim; *ShieldMark, Inc. v. Creative Safety Supply, LLC*; ND Ohio ED, 1:12-cv-00221-CAB; Jul. 30, 2012 (6 pages).

Defendant Creative Safety Supply, LLC's Memorandum in Reply Supporting Motion to Amend Counterclaims and Add Third Parties; *ShieldMark, Inc. v. Creative Safety Supply, LLC*; ND Ohio ED, 1:12-cv-00221-CAB; Aug. 9, 2012 (7 pages).

Defendant Creative Safety Supply, LLC's Memorandum in Reply Supporting Motion to Amend Counterclaims and Add Third Parties; *ShieldMark, Inc. v. Creative Safety Supply, LLC*; ND Ohio ED, 1:12-cv-00221-CAB; Aug. 10, 2012 (9 pages).

Plaintiffs Validity and Enforceability Contentions Pursuant to Local Patent Rule 3.7; *ShieldMark, Inc. v. Creative Safety Supply, LLC*; ND Ohio ED, 1:12-cv-00221-CAB; Aug. 24, 2012 (17 pages).

Defendant's Claim Chart of Invalidity and Unenforceability; *ShieldMark, Inc. v. Creative Safety Supply, LLC*; ND Ohio ED, 1:12-cv-00221-CAB; Sep. 7, 2012 (15 pages).

Complaint for Patent Infringement; *ShieldMark, Inc. v. Ergomat, LLC*; ND Ohio ED, 1:12-cv-00219-DAP; Jan. 30, 2012 (4 pages).

Plaintiffs Motion for Default Judgment and Permanent Injunction; *ShieldMark, Inc. v. Ergomat, LLC*; ND Ohio ED, 1:12-cv-00219-DAP; Jun. 22, 2012 (26 pages).

Judgment Entry; *ShieldMark, Inc. v. Ergomat, LLC*; ND Ohio ED, 1:12-cv-00219-DAP; Jul. 12, 2012 (3 pages).

Unopposed Motion to Vacate Default Judgment and to Dissolve Permanent Injunction; *ShieldMark, Inc. v. Ergomat, LLC*; ND Ohio ED, 1:12-cv-00219-DAP; Jul. 30, 2012 (3 pages).

Amended Complaint for Patent Infringement; *ShieldMark, Inc. v. InSite Solutions, LLC*; ND Ohio ED, 1:12-cv-00223-DCN; Mar. 5, 2012 (10 pages).

Plaintiffs Motion for Preliminary injunction; *ShieldMark, Inc. v. InSite Solutions, LLC*; ND Ohio ED, 1:12-cv-00223-DCN; Apr. 2, 2012 (36 pages).

Answer, Affirmative Defenses and Counterclaims in Response to Amended Complaint; *ShieldMark, Inc. v. InSite Solutions, LLC*; ND Ohio ED, 1:12-cv-00223-DCN; May 25, 2012 (8 pages).

Motion to Dismiss Complaint and Supporting Memorandum of Points and Authorities; *ShieldMark, Inc. v. InSite Solutions, LLC*; ND Ohio ED, 1:12-cv-00223-DCN; Apr. 13, 2012 (9 pages).

Defendant's Motion to Stay Preliminary Injunction Proceedings; *ShieldMark, Inc. v. InSite Solutions, LLC*; ND Ohio ED, 1:12-cv-00223-DCN; Apr. 16, 2012 (3 pages).

Plaintiffs Memorandum in Opposition to Defendant's Motion to Dismiss Complaint; *ShieldMark, Inc. v. InSite Solutions, LLC*; ND Ohio ED, 1:12-cv-00223-DCN; Apr. 29, 2012 (6 pages).

Plaintiffs Memorandum in Opposition to Defendant's Motion to Stay Preliminary Injunction Proceedings; *ShieldMark, Inc. v. InSite Solutions, LLC*; ND Ohio ED, 1:12-cv-00223-DCN; Apr. 24, 2012 (2 pages).

Plaintiffs Initial Infringement Contentions Pursuant to Local Patent Rules 3.1 and 3.2; *ShieldMark, Inc. v. InSite Solutions, LLC*; ND Ohio ED, 1:12-cv-00223-DCN; Apr. 27, 2012 (8 pages).

Defendant's Reply to Plaintiffs Memorandum in Opposition to Defendant's Motion to Stay Preliminary Injunction Proceedings; *ShieldMark, Inc. v. InSite Solutions, LLC*; ND Ohio ED, 1:12-cv-00223-DCN; May 3, 2012 (3 pages).

Defendant's Reply to Plaintiff's Memorandum in Opposition to Defendant's Motion to Dismiss Complaint; *ShieldMark, Inc. v. InSite Solutions, LLC*; ND Ohio ED, 1:12-cv-00223-DCN; May 3, 2012 (5 pages).

Memorandum Opinion and Order; *ShieldMark, Inc. v. InSite Solutions, LLC*; ND Ohio ED, 1:12-cv-00223-DCN; May 18, 2012 (4 pages).

Defendant's Initial Noninfringement Contentions Pursuant to Local Patent Rules 3.3 and 3.4; *ShieldMark, Inc. v. InSite Solutions, LLC*; ND Ohio ED, 1:12-cv-00223-DCN; May 25, 2012 (6 pages).

Reply to Counterclaim; *ShieldMark, Inc. v. InSite Solutions, LLC*; ND Ohio ED, 1:12-cv-00223-DCN; Jun. 15, 2012 (6 pages).

Invalidity and Unenforceability Contentions of InSite Solutions, LLC Under L.P.R. 3.5 (a-c); *ShieldMark, Inc. v. InSite Solutions, LLC*; ND Ohio ED, 1:12-cv-00223-DCN; Jun. 15, 2012 (213 pages).

In re Control No. 90/012,670, an Office Action dated Nov. 15, 2012, granting ex parte reexamination of Patent No. 8,088,480.

\* cited by examiner

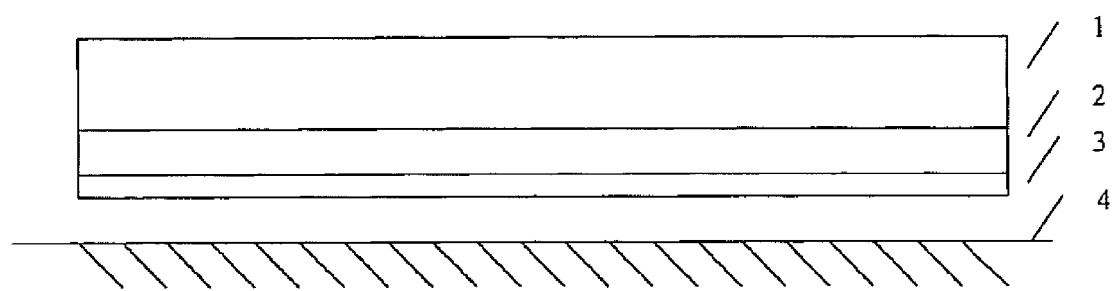

ADHESIVE TAPE

RELATED APPLICATION

This application is a continuation of and claims priority to application Ser. No. 10/674,108 filed Sep. 29, 2003.

BACKGROUND

This invention relates to an adhesive tape having superior ductility, strength, tear resistance and abrasion resistance, particularly a pressure sensitive adhesive. Polymeric pressure sensitive adhesive tapes are economical and adaptable to many different applications. One primary example is as floor marking in industrial and factory environments. However, there are several disadvantages to using such tape in industrial settings. One disadvantage is that the tape lacks sufficient strength and hardness to prevent wearing, tearing, cracking and breakage from heavy and repeated traffic, such as from forklift trucks. Similarly, as a result of poor adhesive quality, repeated traffic has a tendency to detach many commercially available tapes from the floor. Another disadvantage is that the aesthetic qualities and physical properties of the tape are diminished from scuffing, scratching, and the like. Such disadvantages plague existing polymeric pressure sensitive adhesive tapes. Because of these disadvantages that have been associated with polymeric pressure sensitive adhesive tape, wide industry acceptance has been historically difficult to achieve. Accordingly, many opt to rely on the time consuming and exacting practice of painting.

In view of the above discussion, it is an advantage of the present invention to provide a polymeric adhesive tape that has superior ductility, strength, tear resistance and abrasion resistance. Other advantages of the present invention will be apparent from the following detailed description.

SUMMARY OF INVENTION

According to one embodiment, an adhesive tape is provided. The tape has a first layer of polymeric material having a Shore A Hardness of between 92 and 100 and a thickness of between 0.020" and 0.065", and a second layer of adhesive. Preferably, the adhesive is of a pressure sensitive type.

BRIEF DESCRIPTION OF THE DRAWINGS

FIG. 1 is a cross-sectional view illustrating the embodiment of a polymeric pressure sensitive adhesive tape.

DETAILED DESCRIPTION OF THE INVENTION

The adhesive tape of this invention usually comprises a layer of polymeric material and at least one layer of adhesive material. The pressure-sensitive adhesive tape of this invention is not limited to having only the above layers of polymeric material and layer of pressure-sensitive adhesive material. It may optionally have an additional layer, such as a laminating substrate on an outermost side of the above adhesive layer. The laminating substrate is usually peeled off and thrown away when pressure-sensitive adhesive tape is actually used. Therefore, inexpensive materials are preferred, however, there are no particular limitations on the materials used for the laminating substrate.

FIG. 1 is an example of the pressure-sensitive adhesive tape of this invention wherein a layer of polymeric material (1) is attached to the top side of a layer of pressure-sensitive adhesive material (2) and a laminating substrate (3) is attached to the bottom side of the pressure-sensitive adhesive material. Upon removal of the laminating substrate (3), the tape can be applied to a floor (4) with the application of pressure.

The pressure-sensitive adhesive tape of this invention can be produced in a variety of lengths, widths, and thickness. A variety of colors can also be used for the outer surface of the layer of polymeric material (1). For example, safety yellow can be used for aisle markings, or red can be used for quarantine and reject markings in a production facility. Coloring can be achieved by introducing a colorant in any form, including pigments and dyes into the polymeric material.

The adhesive employed in layer material (3) may be any of those heretofore employed in the art for preparing adhesive structures. By way of illustration, suitable adhesives of this general description include those disclosed in U.S. Pat. No. 5,061,559, herein incorporated by reference.

The layer of polymeric material (1) may be a durable polymer such as polyvinyl chloride, polycarbonate, or a terpolymer comprised of acrylonitrile, butadiene and styrene or the like. A clear or tinted polyvinyl chloride is a preferred material. The polymer selected must have Shore A Hardness between, for example, 92-100, and preferably between 93-97. The outer surface of the layer of polymeric material (1) is preferably textured. The layer of polymeric material (1) may have a thickness of about, for example, 0.020" to 0.065".

Advantageously, this embodiment of the invention provides improved tear resistance, strength, and abrasion resistance by employing the sum or all of the combination of polymer selected, Shore A Hardness, textured surface, and layer thickness.

EXAMPLES

One embodiment of the invention will be described below in greater detail through the following examples.

Test samples were performed on a 4" wide sample of the pressure sensitive adhesive tape of this invention. The example tape was constructed of a semi-rigid 95A polyvinyl chloride from Artemis Industries, 2550 Gilcrest Rd, Akron Oh 44305 which was extruded from a 2&½" diameter NRM extrusion machine at 360-380° F. at an extrusion rate of 400 ft per hour to yield a 0.065 thick, 4" wide layer. A textured first surface of the extruded polymer layer was achieved by following the above process parameters. During extrusion a rubberized double sided carpet tape (Product #591B) from International Tape Co., P.O. Box 240, 6 Industrial Drive, Windham, N.H. 03087 was applied to a second side of the extruded polymer layer. A tape from Windmill Tapes of Great Britain (www.windmilltapes.com) was used for comparison purposes. Test samples were conditioned at 73±3° F. and 50±5% relative humidity for at least 24 hours prior to testing.

Tensile strength at yield point was determined according to ASTM D 882 testing method. A 0.5"×8" sample was prepared and placed in the jaws of the instrument at a separation of 4.0". The tester was started at a separation rate of 2.0 in/min. At the instance the tape yielded the force was recorded. Five replicates of each sample were conducted and the results were normalized to pounds per inch width. Results indicate higher yield point and higher absolute forces involved at yield point for the pressure sensitive adhesive tape of this invention. Particularly, the yield point in both machine and traverse direction were respectively, on average, 3,176 lb/in$^2$ and 3,136 lb/in$^2$.

Tear resistance was determined according to the ASTM D 1004 test method. The samples were die cut according to the method. The liner from the sample was removed and the sample was placed in the jaws of the tester at a separation of one inch. The tester was started at a rate of 2.0 in/min. The maximum force encountered during testing was recorded. Five replicates of each sample in both the machine and traverse direction were tested. Results indicate substantially improved tear strength in both the machine and traverse directions for the pressure sensitive adhesive tape of this invention. Particularly, the tear strength in both machine and traverse direction was respectively, on average, 22.3 lb and 22.1 lb.

Caliper or thickness was determined according to the PSTC-33 method. Caliper of the material was determined both with and without the liner. Ten replicates of each sample were measured. Results indicate substantially increased thickness of the pressure sensitive adhesive tape of this invention, partly because of the inherent characteristics of the semi-rigid surface. Particularly, the thickness of the material, with and without the liner, was respectively, on average, 68.4 mil and 65.4 mil.

Peel adhesion was tested according to a modified PSTC-101D method. The modification included dwell time. Peel adhesion is a measure of the strength of the adhesive bond between the tape and the test surface. Exactly one (1.0) inch wide samples were applied to a standard stainless steel test panel at a rate of 24 in/min with a 4.5 pound rubber covered roller according to the method. The tape was then peeled from the substrate at a 90' angle after a dwell time of one hour. The force required for removal was measured. Five replicates of each sample were tested. Results indicate substantially increased peel adhesion for the pressure sensitive adhesive tape of this invention when applied to stainless steel. Particularly, the peel adhesion of this material was, on average, 5.2 lb/in width.

Abrasion resistance was determined according to a modified ASTM D 5264 test method. The material was cut to a 2.5"×6" size. A new 2"×4" piece of standard A-5 receptor material (moderate abrasive) from Gavarti Associates Ltd. was affixed with double-sided tape to the four pound instrument weight (0.5 lb/in2 load). This in turn was placed over the test sample. The instrument was set for 100 strokes and operation was initiated. The instrument strikes an arc with the abrasive over the test material. Each stroke consists of one motion back and forth over the sample. When the cycles were completed the weighted abrasive was lifted and the test sample removed. At the conclusion of the test the overall quality of each sample was evaluated relatively for scratch resistance. Results indicate that the abrasion resistance of the pressure sensitive adhesive tape of this invention is improved over the comparative tape.

Results obtained were as follows:

| | Average | σ (standard deviation) | N (test numbers) |
|---|---|---|---|
| Tensile at Yield at 2.0 in/min, lb/in² | | | |
| Inventive Sample Machine Direction | 3,176 | 152 | 5 |
| Inventive Sample Traverse Direction | 3,136 | 56 | 5 |
| Comparative Sample Machine Direction | 2,400 | 160 | 5 |
| Comparative Sample Transverse Direction | 1,720 | 120 | 5 |
| Tear at 2.0 in/min, lb. | | | |
| Inventive Sample Machine Direction | 22.3 | 1.6 | 5 |
| Inventive Sample Traverse Direction | 22.1 | 0.4 | 5 |
| Comparative Sample Machine Direction | 2.2 | 0.1 | 5 |
| Comparative Sample Transverse Direction | 1.6 | 0.1 | 5 |

-continued

| | Average | σ (standard deviation) | N (test numbers) |
|---|---|---|---|
| Caliper, mil. | | | |
| Inventive Sample With Liner | 68.4 | 0.5 | 10 |
| Inventive Sample Without Liner | 65.4 | 0.5 | 10 |
| Comparative Sample | 5.5 | 0.04 | 10 |
| Adhesion to Stainless lb/in width | | | |
| Inventive Sample | 5.2 | 0.5 | 5 |
| Comparative Sample | 1.7 | 0.03 | 5 |
| Abrasion Resistance | | | |
| Inventive Sample | Excellent—no sign of damage | | |
| Comparative Sample | Fair—moderate damage | | |

Since certain changes may be made without departing from the scope of the invention herein involved, it is intended that all matter described in the foregoing description, including the examples, shall be interpreted as illustrative and not in a limiting sense.

What is claimed is:

1. A method of providing an adhesive polymer marking system comprising:
   Extruding at least one polymer material to yield a polymer layer having a Shore A Hardness of between 92 and 100 and a substantially uniform thickness between 20 mil and 65 mil; and
   Applying a layer of adhesive to the extruded polymer layer, with the adhesive being in direct and uninterrupted contact with the extruded polymer layer,
   where the adhesive polymer marking system has a peel adhesion greater than 2.0 lb/in width, measured under a test method including peeling the tape at a 90 degree angle after application to a stainless steel panel.

2. The method of providing an adhesive polymer marking system as set forth in claim 1, wherein the test method further includes peeling the tape at a 90 degree angle after application to a stainless steel panel and allowing a dwell of one hour.

3. The method of providing an adhesive polymer marking system as set forth in claim 1, further comprising adhering the extruded polymer layer to a substantially planar floor, where the adhered extruded polymer layer provides an adhesive polymer marking system.

4. A method of making an adhesive polymer marking system comprising:
   Extruding at least one polymer material to yield a polymer layer having a Shore A Hardness of between 92 and 100 and an average thickness between 20 mil and 65 mil;
   Texturing at least one surface of the polymer layer; and
   Applying a layer of adhesive to the extruded polymer layer on a side opposite the at least one surface, with the adhesive being in direct and uninterrupted contact with the extruded polymer layer,
   where the adhesive polymer marking system has a tensile strength at yield point when tested under ASTM D 882 testing method greater than 3000 lb/in².

5. The method of providing an adhesive polymer marking system as set forth in claim 4, further comprising adhering the extruded polymer layer to a substantially planar floor, where the adhered extruded polymer layer provides an adhesive polymer marking system.

6. A method of providing an adhesive polymer marking system comprising:
   Extruding at least one polymer material to yield a polymer layer having a Shore A Hardness of between 92 and 100;

Applying a layer of adhesive to the extruded polymer layer on a side opposite the at least one surface, with the adhesive being in direct and uninterrupted contact with the extruded polymer layer, where the adhesive polymer marking system has a thickness between 65 mil and 69 mil and tear resistance in both machine and traverse directions greater than 22 lb.

7. The method of providing an adhesive polymer marking system as set forth in claim 6, further comprising attaching a substrate attached to an outermost side of the layer of adhesive.

8. The method of providing an adhesive polymer marking system as set forth in claim 6, further comprising texturing the extruded polymer layer.

9. The method of providing an adhesive polymer marking system as set forth in claim 6, where the extruding comprises extruding a polyvinyl chloride to yield a polymer layer having a Shore A Hardness of between 92 and 100.

10. The method of providing an adhesive polymer marking system as set forth in claim 6, where the applying comprises applying a rubberized double-sided tape.

11. The method of providing an adhesive polymer marking system as set forth in claim 6, where the extruding comprises extruding a polymer to yield a polymer layer having a Shore A Hardness between about 93 and 97.

\* \* \* \* \*